United States Patent [19]
Yoshioka et al.

[11] Patent Number: 5,479,173
[45] Date of Patent: Dec. 26, 1995

[54] OBSTACLE SENSING APPARATUS FOR VEHICLES

[75] Inventors: Tohru Yoshioka, Hatsukaichi; Yasunori Yamamoto, Higashi-hiroshima; Tomohiko Adachi; Ken-ichi Okuda, both of Hatsukaichi, all of Japan

[73] Assignee: Mazda Motor Corporation, Hiroshima, Japan

[21] Appl. No.: 207,365

[22] Filed: Mar. 8, 1994

[30] Foreign Application Priority Data

Mar. 8, 1993 [JP] Japan .................... 5-046212

[51] Int. Cl.$^6$ ................................ G06F 15/50
[52] U.S. Cl. ............. 342/70; 364/424.01; 364/424.02; 364/436; 342/71
[58] Field of Search ................ 342/70, 71, 72; 364/424.01, 424.02, 436

[56] References Cited

U.S. PATENT DOCUMENTS

| | | | |
|---|---|---|---|
| 5,172,315 | 12/1992 | Asanuma et al. | 364/424.02 |
| 5,208,750 | 5/1993 | Kurami et al. | 364/424.02 |
| 5,233,527 | 8/1993 | Shinnosuke | 364/424.02 |
| 5,243,524 | 9/1993 | Ishida et al. | 364/424.02 |
| 5,314,037 | 5/1994 | Shaw et al. | 180/167 |
| 5,343,206 | 8/1994 | Ansaldi et al. | 342/70 |

FOREIGN PATENT DOCUMENTS

| | | |
|---|---|---|
| 51-7892 | 3/1976 | Japan . |
| 2-287180 | 11/1990 | Japan . |
| 6-131596 | 5/1994 | Japan . |

*Primary Examiner*—Mark Hellner

[57] ABSTRACT

An obstacle sensing apparatus for vehicles which enables efficient obstacle sensing and improves sensing precision. The apparatus comprises a section for predicting a deduced traveling-passage on which the vehicle will travel, based on a steering angle, a yaw rate and a velocity of the vehicle, a section having a CCD camera, for detecting a current traveling-passage on which the vehicle is currently moving, a scanning-type radar unit for sensing obstacles within a predetermined area, and a danger level judging section for judging danger levels of the sensed obstacles, based on the deduced traveling-passage and the current traveling-passage. The danger level judging section sets the danger level of the obstacle sensed within an area, where the deduced traveling-passage and the current traveling-passage overlap with each other, to the highest danger level; the obstacle sensed in an area within the current traveling-passage and without the deduced traveling-passage, to an intermediate danger level; the obstacle sensed in an area within the deduced traveling-passage and without the current traveling-passage, to a lower danger level; and the obstacle sensed in an area without the current and deduced traveling-passages, to the lowest danger level.

56 Claims, 12 Drawing Sheets

OBSTACLE SENSING APPARATUS FOR VEHICLES

BACKGROUND OF THE INVENTION

1. Field of the Invention

Present invention relates to an obstacle sensing apparatus mounted on a vehicle to avoid accidents, e.g., collisions and, more particularly, to an obstacle sensing apparatus for sensing the distance between the vehicle and an obstacle in front of the vehicle.

2. Description of the Related Art

Japanese Patent Application Laid-Open (Kokai) No. 2-287180 presents a scanning-type radar unit, which transmits radar waves such as optical waves and radio waves forward, and receives the radar waves reflected from an obstacle in front of the vehicle such as a vehicle running ahead. The distance between the vehicle and the obstacle and the direction from the obstacle to the vehicle are predicted by measuring a time period between the transmitting point and the receiving point. If the radar unit transmits radar waves within a comparatively wide range in front of the vehicle, the radar unit detects an obstacle even upon quick turning of the vehicle body. However, as the sensing covers such wide range, a large amount of unnecessary information intrudes in the radar unit. This prolongs measurement to specify obstacles of highest danger level. Since the sensing of obstacles cannot be made efficiently, problems may occur when judging the possibility of encounter with the obstacle.

To solve the above drawback, Japanese Patent Publication (Kokoku) No. 51-7892 provides an obstacle sensing apparatus comprising traveling-path predicting means for predicting a path on which the vehicle will travel, based on the running state of the vehicle indicated by the steering angle, the velocity, etc. The obstacle sensing device picks up only information within a range which covers the traveling-path predicted by the traveling-path predicting means, included in the obstacle information obtained from wide-range sensing by a radar unit.

Assuming that this conventional obstacle sensing apparatus performs traveling-path prediction, at a point where the road changes from a straight road to a curved road, the predicted traveling-path will not coincide with the actual road. This may cause erroneous obstacle sensing. For example, the guardrail of the road may be recognized as an obstacle.

SUMMARY OF THE INVENTION

The present invention has been made in consideration of the above situation, and has as its object to provide a vehicle obstacle sensing apparatus, which, upon sensing obstacles by scanning of a radar unit, defines the level of danger to be caused by the sensed obstacle, based on a deduced traveling-passage, predicted in accordance with the running state and a current traveling passage on which the vehicle is currently running. The obstacle sensing apparatus according to the present invention picks up only obstacle information of the highest danger level. Thus, the obstacle sensing for judging possibility of encounter with the obstacle can be performed efficiently. In addition, the obstacle sensing apparatus improves its detecting precision.

According to the present invention, the foregoing object is attained by providing a vehicle obstacle sensing apparatus comprising:

(a) deduced traveling-passage prediction means for predicting a deduced traveling-passage on which a vehicle will travel, based on a steering angle, a yaw rate and a velocity of the vehicle;

(b) current traveling-passage detection means for detecting a current traveling-passage on which the vehicle is currently moving;

(c) obstacle sensing means for sensing a plurality of obstacles within a predetermined area; and (d) danger level judgment means for judging a danger level of one of the obstacles sensed by said obstacle sensing means, based on the deduced traveling-passage predicted by said deduced traveling-passage prediction means and the current traveling-passage detected by said current traveling-passage detection means.

Further, an obstacle sensing apparatus according to another aspect of the present invention comprises:

(a) current traveling-passage detection means for detecting a current traveling-passage on which the vehicle is currently running;

(b) obstacle sensing means for sensing a plurality of obstacles within a predetermined area;

(c) road curvature change detection means for detecting, in advance, a curvature change of the current traveling-passage; and (d) danger level judgment means for judging a danger level of one of the obstacles sensed by said obstacle sensing means, based on the curvature change detected by said road curvature change detection means.

Further, an obstacle sensing apparatus according to another aspect of the present invention comprises:

(a) deduced traveling-passage prediction means for predicting a deduced traveling-passage on which a vehicle will travel, based on a steering angle, a yaw rate and a velocity of the vehicle;

(b) current travelling-passage detection means for detecting a current traveling-passage on which the vehicle is currently running;

(c) obstacle sensing means for sensing a plurality of obstacles within a predetermined area;

(d) deduced traveling-passage correction means for defining an obstacle judgment area for judging a danger level of one of the obstacles based on the deduced traveling-passage predicted by said deduced traveling-passage prediction means and the current traveling-passage detected by said current traveling-passage detection means; and (e) danger level judgment means for judging the danger level of one of the obstacles sensed by said obstacle sensing means, based on the obstacle judgment area defined by said deduced traveling-passage correction means.

Further, an obstacle sensing apparatus according to another aspect of the present invention comprises:

(a) deduced traveling-passage prediction means for predicting a deduced traveling-passage on which a vehicle will travel, based on a steering angle, a yaw rate and a velocity of the vehicle;

(b) current traveling-passage detection means for detecting a current traveling-passage on which the vehicle is currently running;

(c) obstacle sensing means for sensing a plurality of obstacles within a predetermined area;

(d) precision judgment means for judging prediction precision of said deduced traveling-passage prediction means and detection precision of said current traveling-passage detection means; and (e) danger level judgment means for judging a danger-level of one of the obstacles sensed by said obstacle sensing means, based on the prediction precision and the detection precision judged by said precision judgment mean.

Other objects and advantages besides those discussed above will be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
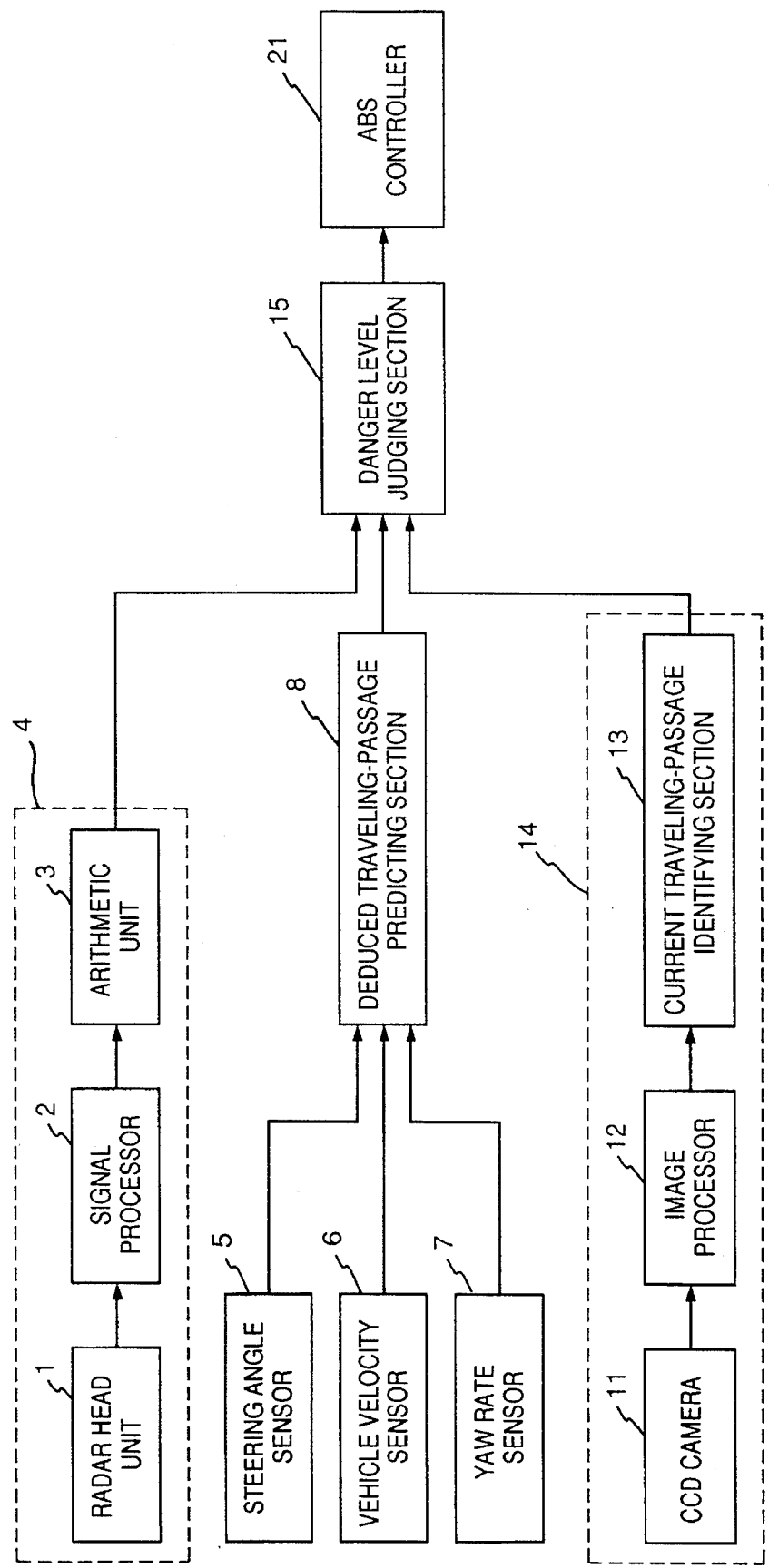
FIG. 1 is a block diagram showing the configuration of a vehicle obstacle sensing apparatus according to a first embodiment of the present invention.

FIG. 1 shows the configuration of an obstacle sensing apparatus according to the first embodiment of the present invention. This obstacle sensing apparatus is mounted on a vehicle i with an automatic braking system (ABS) which automatically provides the respective wheels with braking force. The automatic braking system works in accordance with obstacle information from obstacle sensing by the obstacle sensing apparatus.

In FIG. 1, a radar head unit 1, provided in a front portion of a vehicle body, transmits laser pulses as radar waves forward from a transmitter, and receives reflection waves from obstacles, e.g., a car running ahead, by a receiver. The radar head unit 1 is a scanning-type radar unit which performs scanning at a comparatively wide angle in a horizontal direction. Signals from the radar head unit 1 enter, via a signal processor 2, an arithmetic unit 3 which calculates the distances between the obstacles and the vehicle within the scanning range, relative velocities and the directions from the obstacles to the vehicle, based on delay time periods upon receiving the emitted and reflected laser pulses. The radar head unit 1, the signal processor 2 and the arithmetic unit 3 form a scanning-type radar unit 4 for sensing obstacles within a predetermined range in front of the vehicle. A steering angle sensor 5 detects the steering angle of a steering handle (hereinafter "steering angle"). A vehicle velocity sensor 6 detects the velocity of the vehicle. A yaw rate sensor 7 detects the yaw rate of the vehicle. Detection signals from the steering angle sensor 5, the vehicle velocity sensor 6 and the yaw rate sensor 7 enter a deduced traveling-passage predicting section 8. The deduced traveling-passage predicting section 8 predicts a deduced traveling-passage, on which the vehicle will travel, based on the steering angle and the vehicle velocity. It should be noted that the prediction method of the deduced traveling-passage predicting section 8 will be described later.

A CCD camera 11, fixed to the front portion of the vehicle body, displays a view in front of the vehicle. Image data of the view displayed by the CCD camera 11 enters, via an image processor 12, a current traveling-passage identifying section 13. The current traveling-passage identifying section 13 identifies a current traveling-passage by extracting right and left white lines on the road surface (current traveling-passage) on which the vehicle is currently moving. The CCD camera 11, the image processor 12 and the current traveling-passage identifying section 13 form a current traveling-passage detecting section 14.

Obstacle information from the radar unit 4 (arithmetic unit 3), prediction information from the deduced traveling-passage predicting section 8 and detection information from the current traveling-passage detecting section 14 enter a danger level judging section 15. The danger level judging section 15 makes judgment of the level of danger to be caused by the obstacles sensed by the radar unit 4, based on the deduced traveling-passage predicted by the deduced traveling-passage predicting section 8 and the current traveling-passage detected by the current traveling-passage detecting section 14. The danger level judging section 15 outputs information of the highest danger level (e.g., the distance between the vehicle and the obstacle and the relative velocity therebetween) to an ABS controller 21. The ABS controller 21 performs danger avoiding processing by Controlling the operation of the ABS and an alarm.

Figure 2:
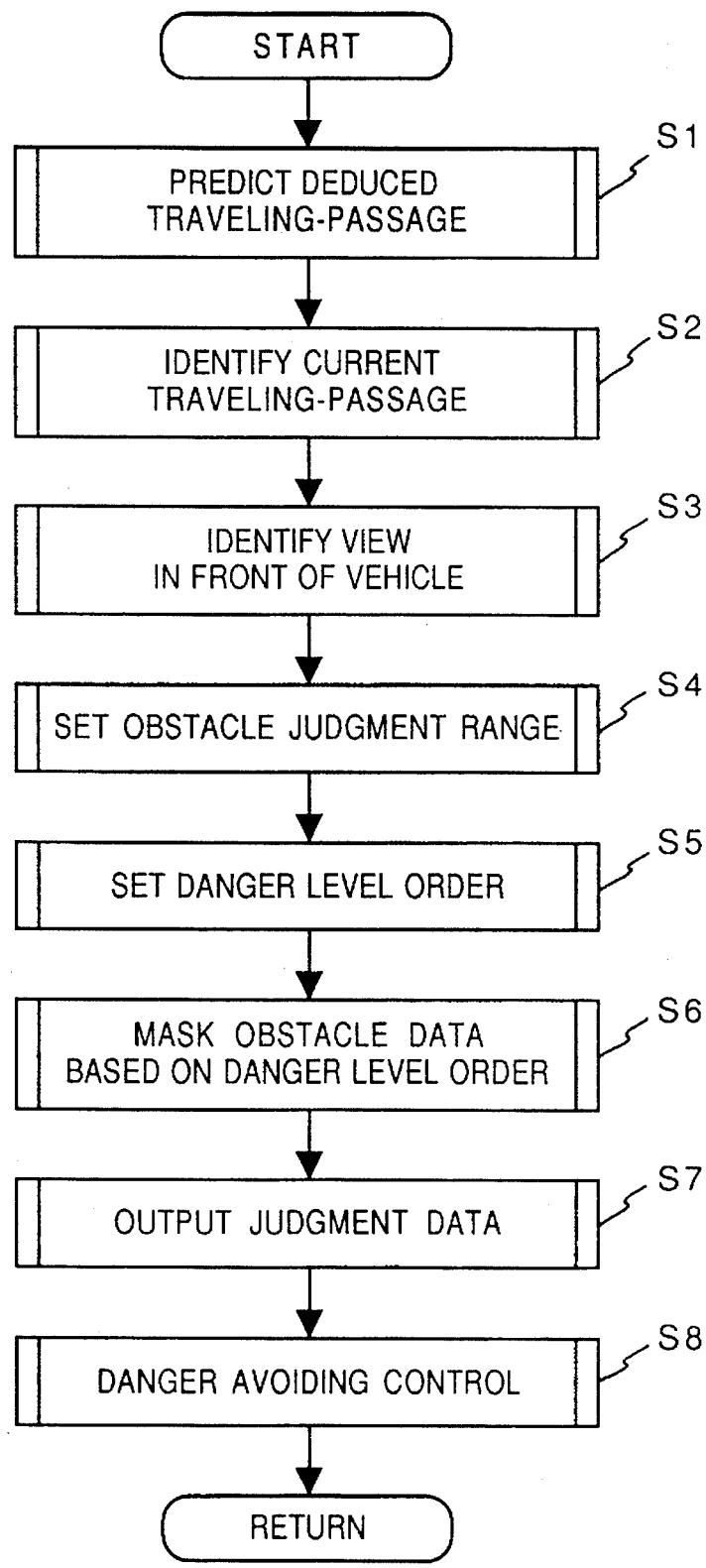
FIG. 2 is a flowchart showing an obstacle sensing method by the obstacle sensing apparatus in the first embodiment.

Next, the obstacle sensing method by the obstacle sensing apparatus in this embodiment will be described with reference to the flowchart in FIG. 2.

First, a deduced traveling-passage is predicted in step S1. The prediction of deduced traveling-passage is performed by the deduced traveling-passage predicting section 8 in accordance with the subroutine in FIG. 3 to be described hereinbelow.

Figure 3:
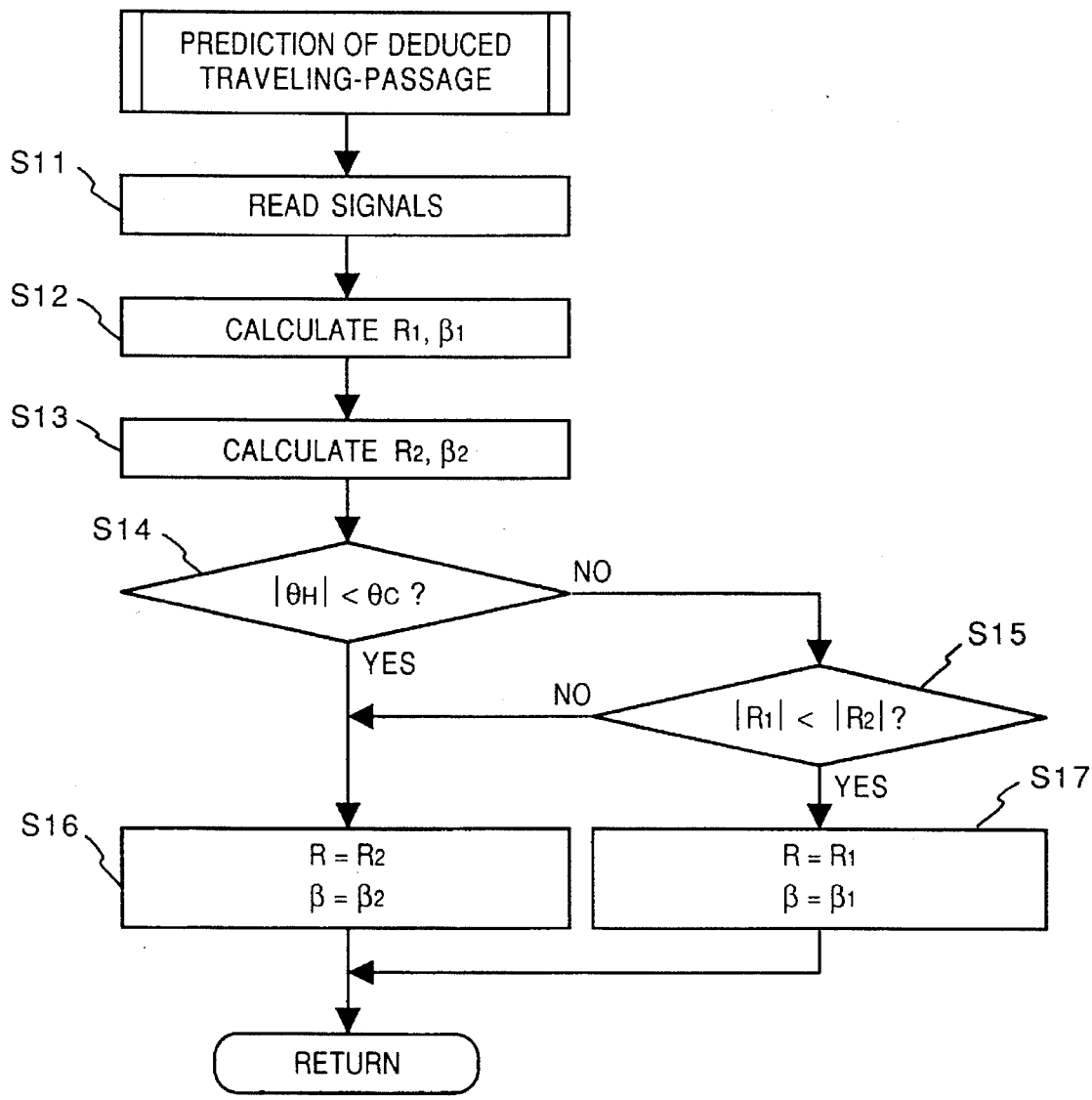
FIG. 3 is a flowchart showing a subroutine of predicting a deduced traveling-passage.

In FIG. 3, the deduced traveling-passage predicting section 8 inputs signals from the steering angle sensor 5, the vehicle velocity sensor 6 and the yaw rate sensor 7 in step S11. Thereafter, the section 8 predicts a first deduced traveling-passage, based on the steering angle $\theta_H$ and the vehicle velocity V0 in step S12. More specifically, the section 8 calculates a turning (curvature) radius $R_1$ of the deduced traveling-passage and a lateral slip angle $\beta_1$ of the vehicle from the following equations:

$$R_1 = (1 + A \cdot V_0^2) \cdot l \cdot N / \theta_H$$

$$\beta_1 = \{-1 + (m/2l) \cdot (l_f/l_r \cdot K_r) \cdot V_0^2\} / (1 + A \cdot V_0^2) \cdot (l_f/l) \cdot (\theta_H/N) \quad (1)$$

A: stability factor

N: steering gear ratio l: wheel base $l_f$: distance between vehicle center of gravity and front wheels $l_r$: distance between vehicle center of gravity and rear wheels m: vehicle mass $K_r$: cornering power per rear wheel Next, in step S13, the section 8 predicts a second deduced traveling-passage based on the yaw rate $\gamma$ and the vehicle velocity $V_0$. More specifically, the section 8 calculates a turning radius $R_2$ of the deduced traveling-passage and a lateral slip angle $\beta_2$ from the following equations:

$$R_1 = V_0/\gamma$$

$$\beta_2 = \beta_1 - m \cdot \{(l_f^2 \cdot K_f + l_r^2 \cdot K_r) / (2 \cdot l^2 \cdot A \cdot K_f \cdot K_r)\} \cdot (1/R_2 - 1/R_1)$$

$$\beta_2 = \beta_1 + \{(l_f^2 \cdot K_f + l_r^2 \cdot K_r) / (l_f \cdot K_f - l_r \cdot K_r)\} \cdot (1/R_2 - 1/R_1) \quad (2)$$

$R_1, \beta_1$: value obtained from equation (1)

$K_f$: cornering power per front wheels

Thereafter, whether or not the absolute value of the steering angle $\theta_H$ is smaller than a predetermined angle $\theta_c$ is determined in step S14. If YES, the flow advances to step S16, in which the second deduced traveling-passage is selected, the turning radius R is set to $R_2$, and the lateral slip angle $\beta$ is set to $\beta_2$. Then the process returns to step S1.

On the other hand, if NO in step S14, i.e., the absolute value of the steering angle $\theta_H$ is greater than the predetermined angle $\theta_c$, the flow advances to step S15, in which the absolute value of the turning radius $R_1$ of the first deduced traveling-passage is compared with the absolute value of the turning radius $R_2$ of the second deduced traveling-passage. If the turning radius $R_1$ is greater, i.e., if YES in step S15, the flow advances to step S17, in which the turning radius R of the deduced traveling-passage is set to $R_1$, and the lateral slip angle of the vehicle is set to $\beta_1$. Then, the process returns to step S1.

On the other hand, if the turning radius $R_1$ is smaller, i.e., if NO in step S15, the flow advances to step S16, in which the turning radius of the deduced traveling-passage is set to $R_2$, and the lateral slip angle of the vehicle is set to $\beta_2$. That is, in step S15, the radius $R_1$ and $R_2$ are compared, and the smaller one is selected for the deduced traveling-passage.

In this manner, the deduced traveling-passage is predicted. Thereafter, in FIG. 2, the current traveling-passage detecting section identifies a current traveling-passage in step S2. In step S3, the radar unit 4 identifies a view in front of the vehicle.

Figure 4:
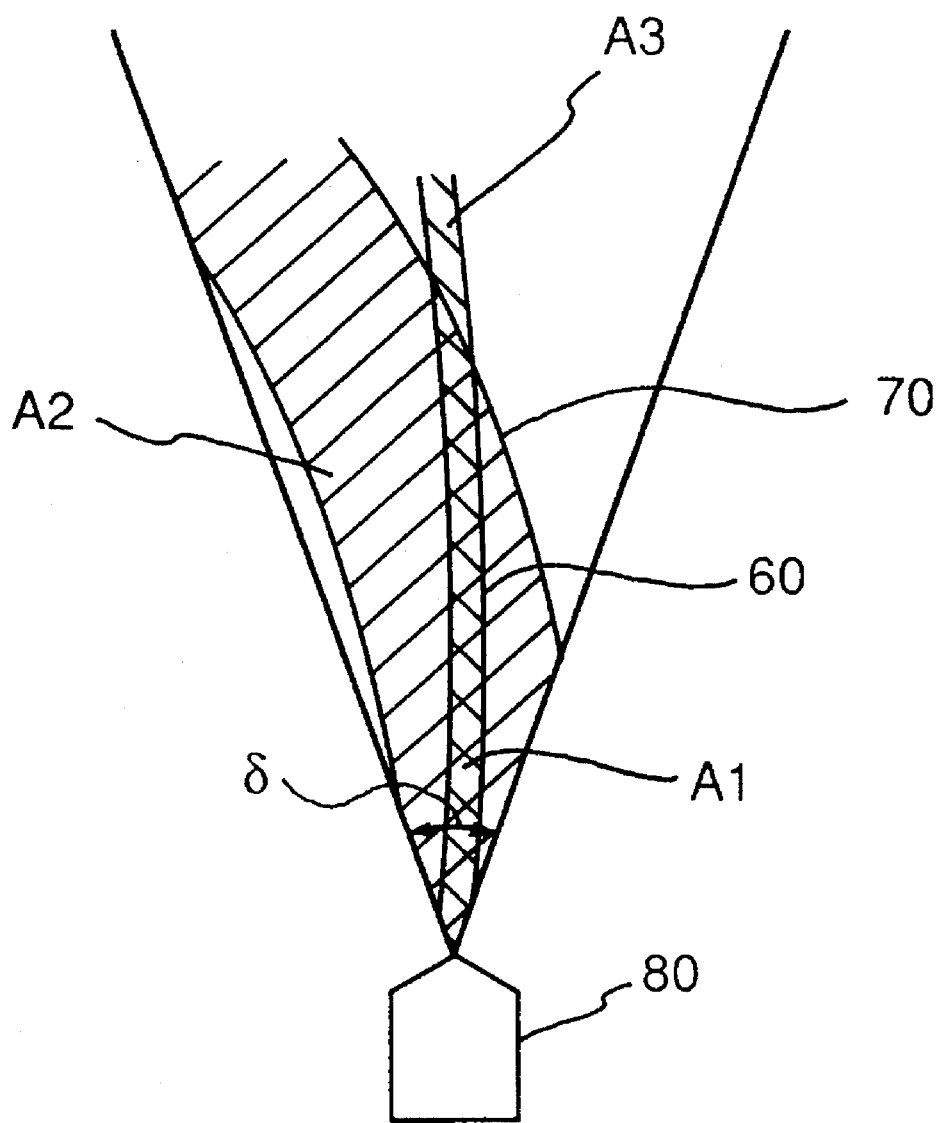
FIG. 4 illustrates danger level order settings.

Next, in step S4, an obstacle judgment area is set, and in step S5, a danger level order is set. As shown in FIG. 4, the obstacle judgment area is an area in the sensing range (within inclined angle $\sigma$) of the radar unit 4. This area has a possibility of judging the level of danger of sensed obstacles as the highest. In this embodiment, the obstacle judgment area is set within a deduced traveling-passage 60 or within a current traveling-passage 70. The danger level order indicates an order of the danger levels within the obstacle judgment area. In this embodiment, an area A1, where the deduced traveling-passage 60 and the current traveling-passage 70 overlap with each other, is designated as the highest danger level area; an area A2, within the current traveling-passage 70 and without the deduced traveling-passage 60, as an intermediate danger level area; and area A3, within the deduced traveling-passage 60 and without the current traveling-passage 70, as a lower danger level area. It should be noted that an area without the obstacle judgment area, i.e., an area which does not belong to any of the deduced traveling-passage 60 and the current traveling-passage 70, is designated as the lowest danger level area.

Next, in step S6, masking of obstacle data based on the danger level order is performed, and in step S7, information on an obstacle of the highest danger level is outputted. Note that the danger level judging section 15 executes steps S4 to S7. Thereafter, the ABS controller performs danger avoiding control in step S8. Then the process returns.

As described above, in the obstacle sensing apparatus according to the first embodiment, as the scanning-type radar unit 4 senses obstacles in a comparatively wide range (within inclined angle $\sigma$), the deduced traveling-passage predicting section 8 predicts a deduced traveling-passage 60 on which the vehicle will travel based on the running state of the vehicle, and the current traveling-passage detecting section 14 detects a current traveling-passage 70 on which the vehicle is currently running. The danger level judging section 15 judges the levels of danger of obstacles sensed by the radar unit 4, based on the deduced traveling-passage 60 and the current traveling-passage 70. The danger level judging section 15 outputs, based on the judgment results, only information on an obstacle of the highest danger level, to the ABS controller 21 to perform the danger avoiding control. Thus, the detection of obstacles Can be made efficiently, and high-speed and proper danger avoiding control can be achieved.

Particularly, as this embodiment sets the danger level of the area A2 within the current traveling-passage 70 higher than the area A3 within the deduced traveling-passage 60, when the vehicle enters a curved road from a straight road, or vice versa, i.e., the deduced traveling-passage 60 does not coincide with the current traveling-passage 70, an obstacle on the current traveling-passage 70 is judged as the highest danger level obstacle. This prevents erroneous sensing, e.g., judging a guardrail at the edge of a road as the highest danger level obstacle.

The deduced traveling-passage predicting section 8 performs the prediction of a first deduced traveling-passage based on a steering angle $\theta_H$ and a vehicle velocity $V_0$ and the prediction of a second deduced traveling-passage based on a yaw rate $\gamma$ and the vehicle velocity $V_0$. The deduced traveling-passage predicting section 8 adopts either one of the first and second deduced traveling-passages in accordance with the running state of the vehicle, which obtains an appropriate deduced traveling-passage. For example, if the vehicle is running on a curved road which is canted, the vehicle turns due to the cant without any significant turning of the steering wheel. As a result, the turning radius $R_2$ of the second deduced traveling-passage predicted based on the yaw rate $\gamma$ becomes smaller than the turning radius $R_1$ of the first deduced traveling-passage predicted based on the steering angle $\theta_H$. In this case, the deduced traveling-passage predicting section 8 adopts the second deduced traveling-passage, thus the prediction of a deduced traveling-passage can be appropriately performed. Further, when the vehicle makes a critical turn, the deduced traveling-passage prediction section 8 predicts an appropriate deduced traveling-passage, since the section 8 predicts that the turning radius $R_1$ will be smaller in correspondence with the steering angle $\theta_H$ that will be a large value.

Second Embodiment

Figure 5:
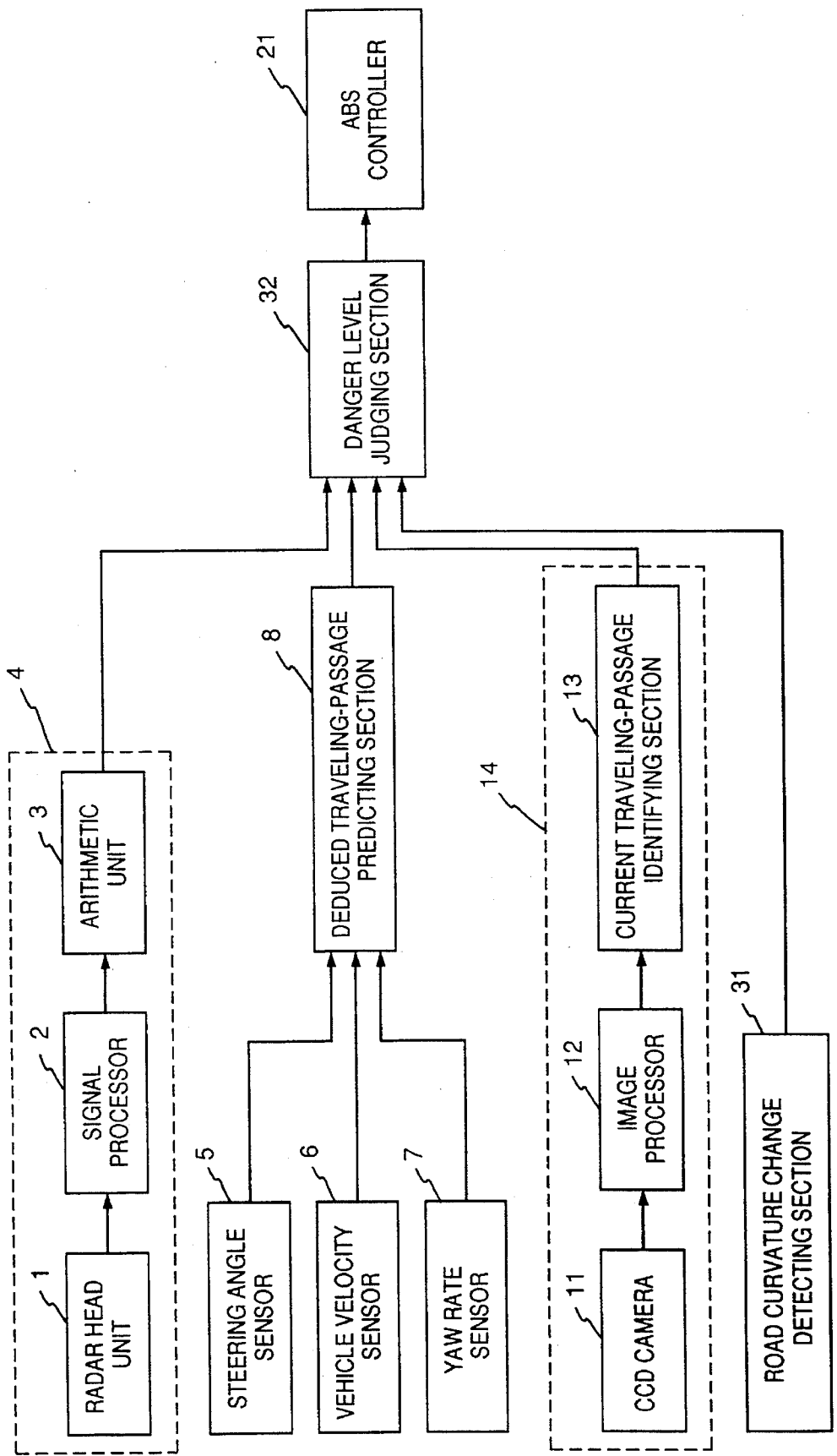
FIG. 5 is a block diagram showing the configuration of an obstacle sensing apparatus according to a second embodiment.
Figure 6:
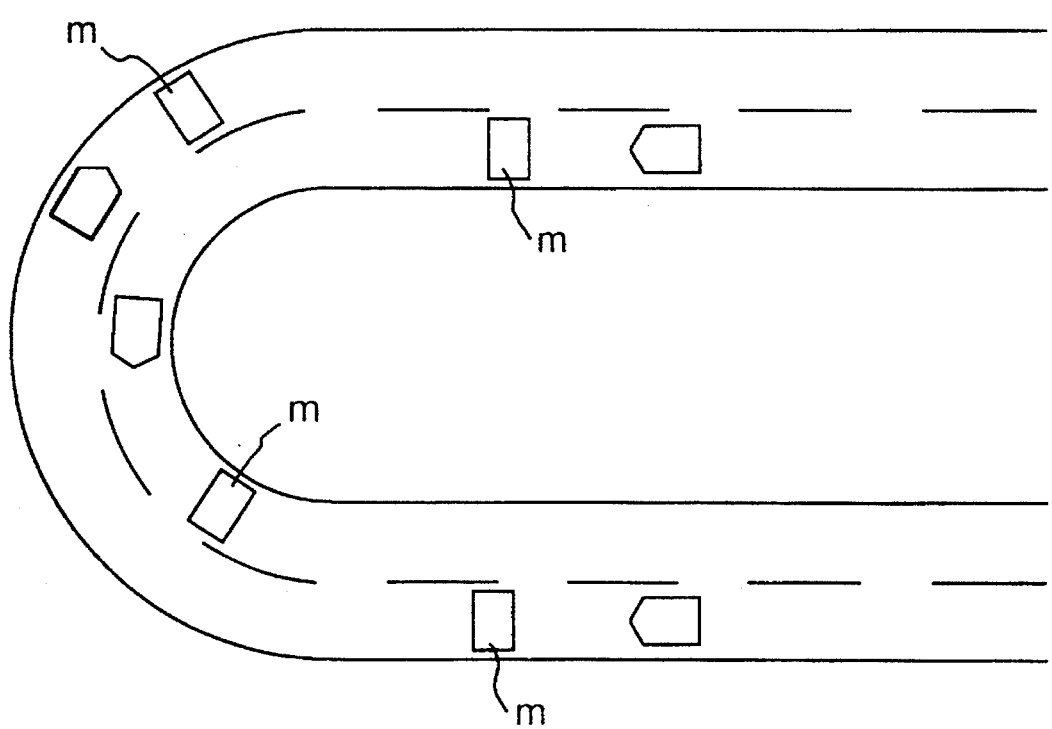
FIG. 6 illustrates markers laid under a road surface.

FIG. 5 shows the configuration of an obstacle sensing apparatus according to the second embodiment. The obstacle sensing apparatus has a road curvature change detecting section 31 which detects the change in curvature of a road. As shown in FIG. 6, the road curvature change detecting section 31 detects the curvature change by detecting a marker m laid under a road surface (See FIG. 6), at a position a predetermined distance ahead of the starting point of a curved road on which the vehicle will travel from a current straight road, or from the starting point of a straight road on which the vehicle will travel from a current curved road. The detection information from the road curvature change detecting section 31 enters a danger level judging section 32. It should be noted that the other elements in FIG. 5 are identical to those in the first embodiment shown in FIG. 1, therefore, the corresponding elements have the same reference numerals and the explanations of the elements will be omitted.

Figure 7:
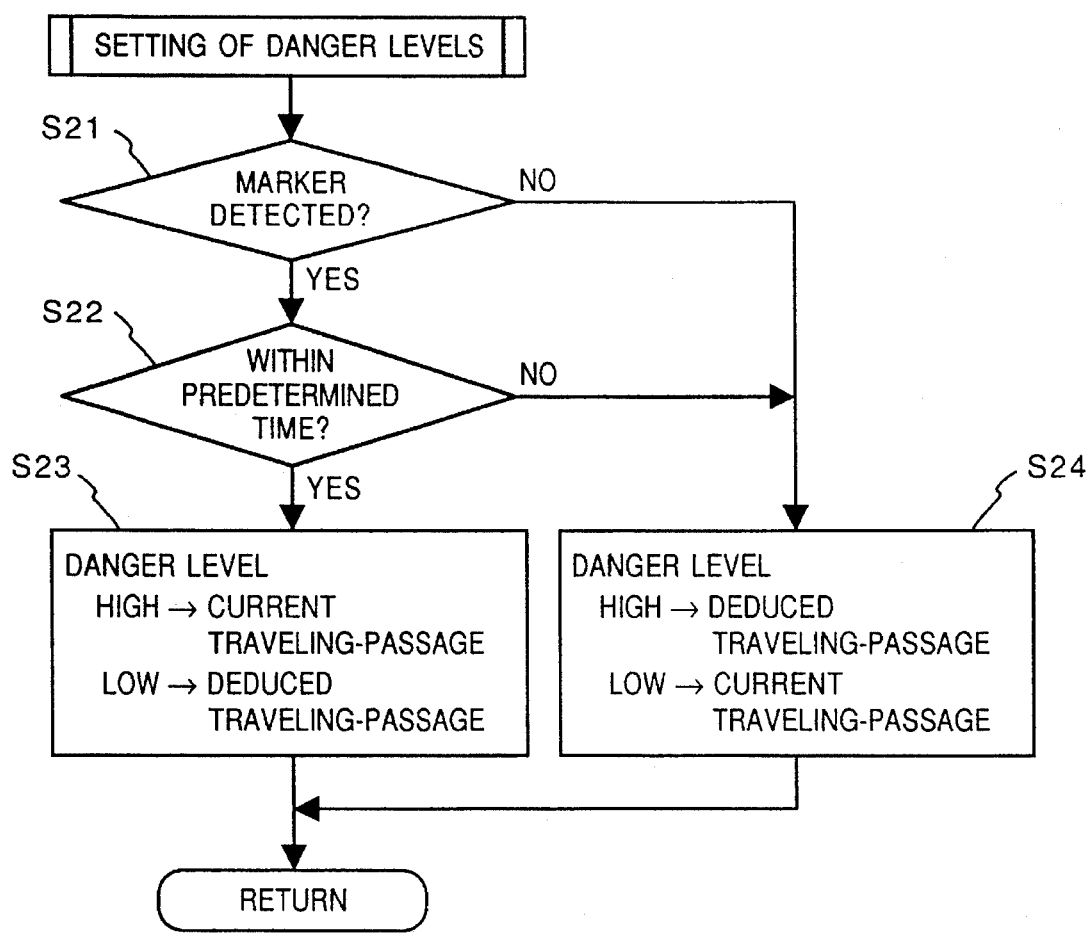
FIG. 7 is a flowchart showing a subroutine of setting the danger level order.

The danger level judging section 32 sets a danger level order in accordance with the subroutine shown in FIG. 7. In step S21, whether or not the marker m is detected is determined. If YES, whether or not time elapsed from the detection of the marker m is within a predetermined time period is determined in step S22. If YES, the danger level of a current traveling-passage is set to be higher than that of a deduced traveling-passage. Thereafter, the process returns. On the other hand, if NO, i.e., it is determined that the marker m is not detected in step S21, or, if it is determined in step S22 that the time elapsed from the detecting point is over the predetermined time period, the process proceeds to step S24, in which the danger level of the deduced traveling-passage is set to be higher than that of the current traveling-passage. Thereafter, the process returns. That is, when the road curvature changes, if time elapsed from a point of detecting the marker m is within a predetermined time period, the danger level judging section 32 sets the danger level of a current traveling-passage higher than that of a deduced traveling-passage.

As described above, the second embodiment lays the marker m at a position ahead of a portion where the road curvature changes, such as the starting point of a curved/straight road from a straight/curved road. The road curvature change detecting section 31 detects and the danger level judging section 32 sets the danger level of the current traveling-passage higher than that of the deduced traveling-passage. Similarly to the first embodiment, even if a deduced traveling-passage 60 does not coincide with a current traveling-passage 70, an obstacle on the current traveling-passage 70 is regarded as the highest danger level obstacle. This prevents erroneous obstacle sensing, e.g., judging a guardrail on a road as an obstacle of the highest danger level. Further, the ABS controller 21 inputs only information on the highest danger level obstacle (distance and relative velocity etc.) and performs the danger avoiding control, thus the efficient obstacle sensing attains high-speed and appropriate danger avoiding control.

Third Embodiment

Figure 8:
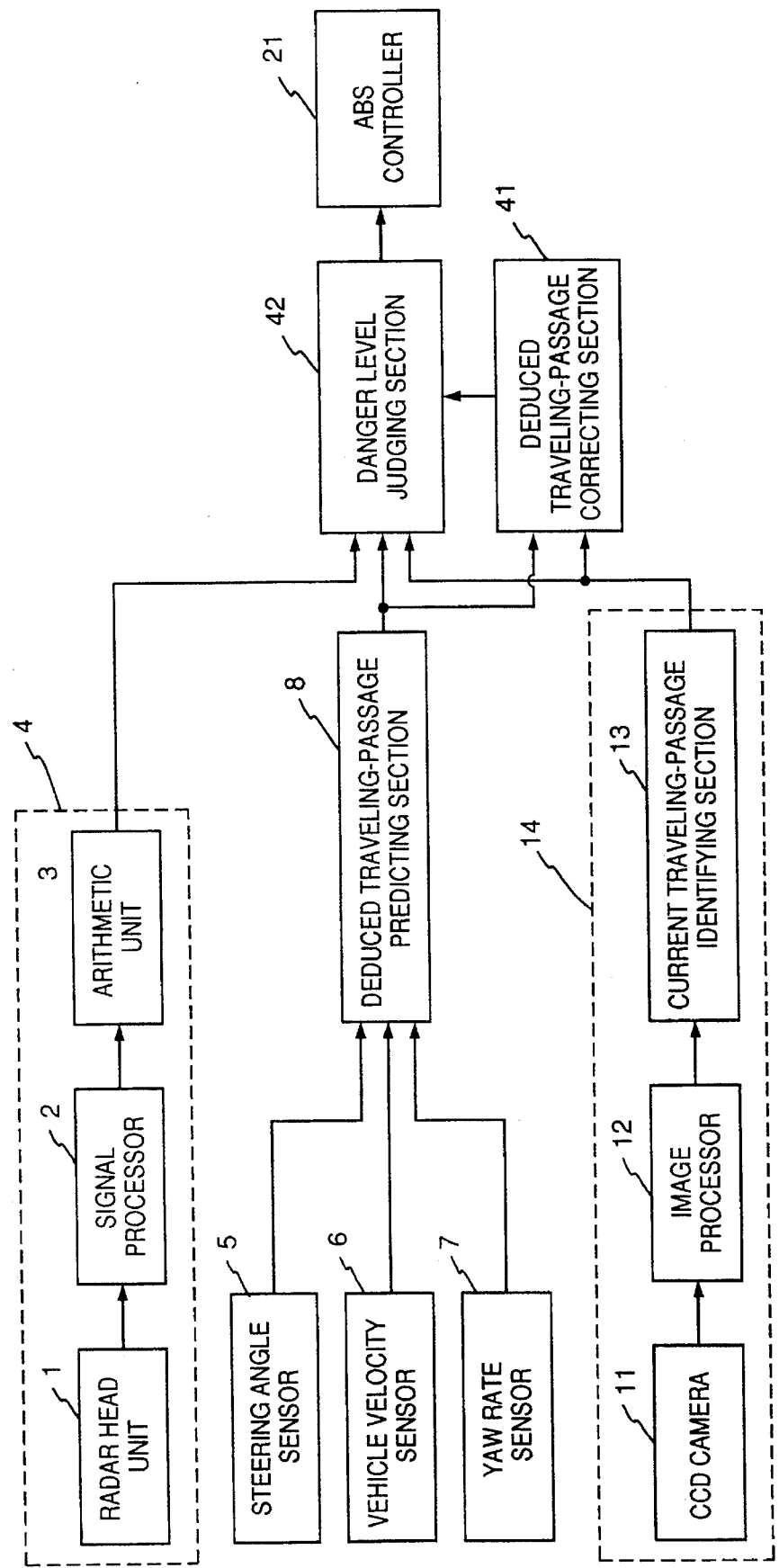
FIG. 8 is a block diagram showing the configuration of an obstacle sensing apparatus according to a third embodiment.

FIG. 8 shows the configuration of an obstacle sensing apparatus according to the third embodiment. This obstacle sensing apparatus has a deduced traveling-passage correcting section 41 which corrects a deduced traveling-passage based ion prediction information from the deduced traveling-passage predicting section 8 and detection information from the current traveling-passage detecting section 14. A correction signal outputted from the deduced traveling-passage correcting section 41 enters a danger level judging section 42. It should be noted that the other elements in FIG. 8 are identical to those in FIG. 1, therefore, the corresponding elements have the same reference numerals and the explanations of these elements will be omitted.

Figure 9:
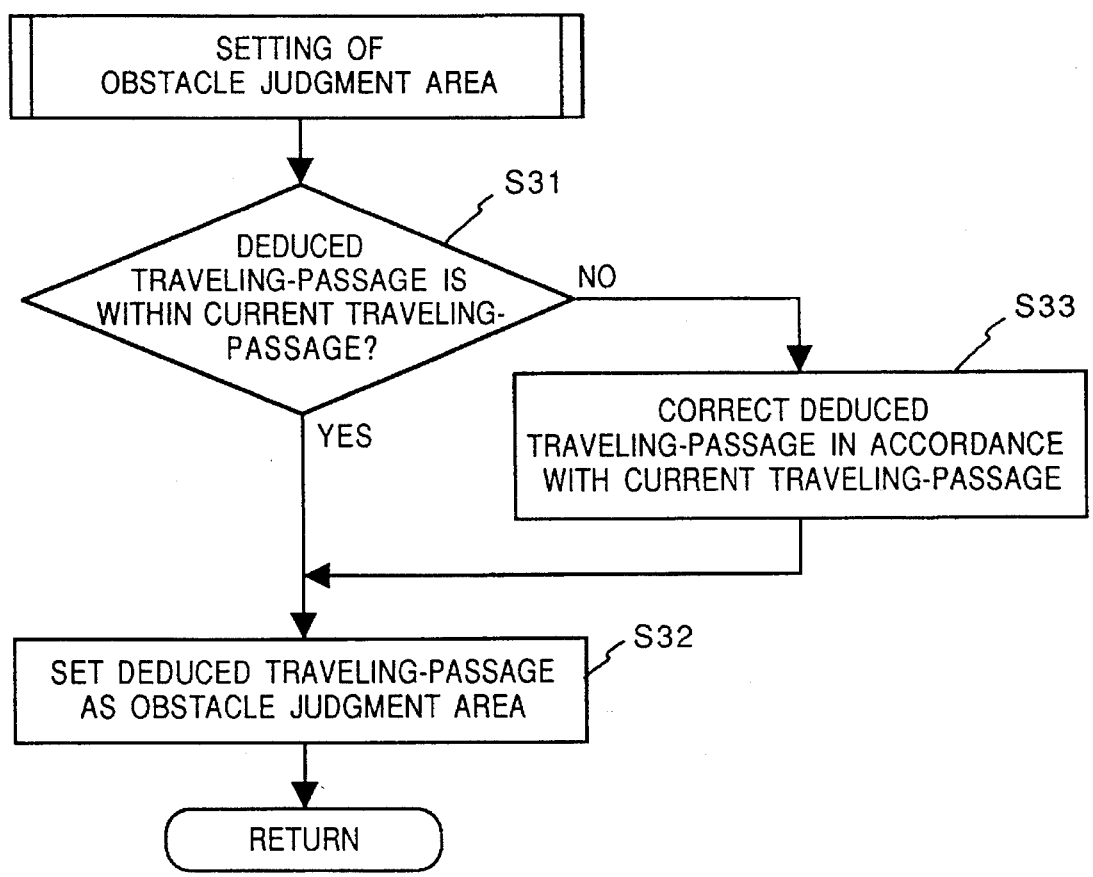
FIG. 9 is a flowchart showing a subroutine of setting an obstacle sensing range.
Figure 10:
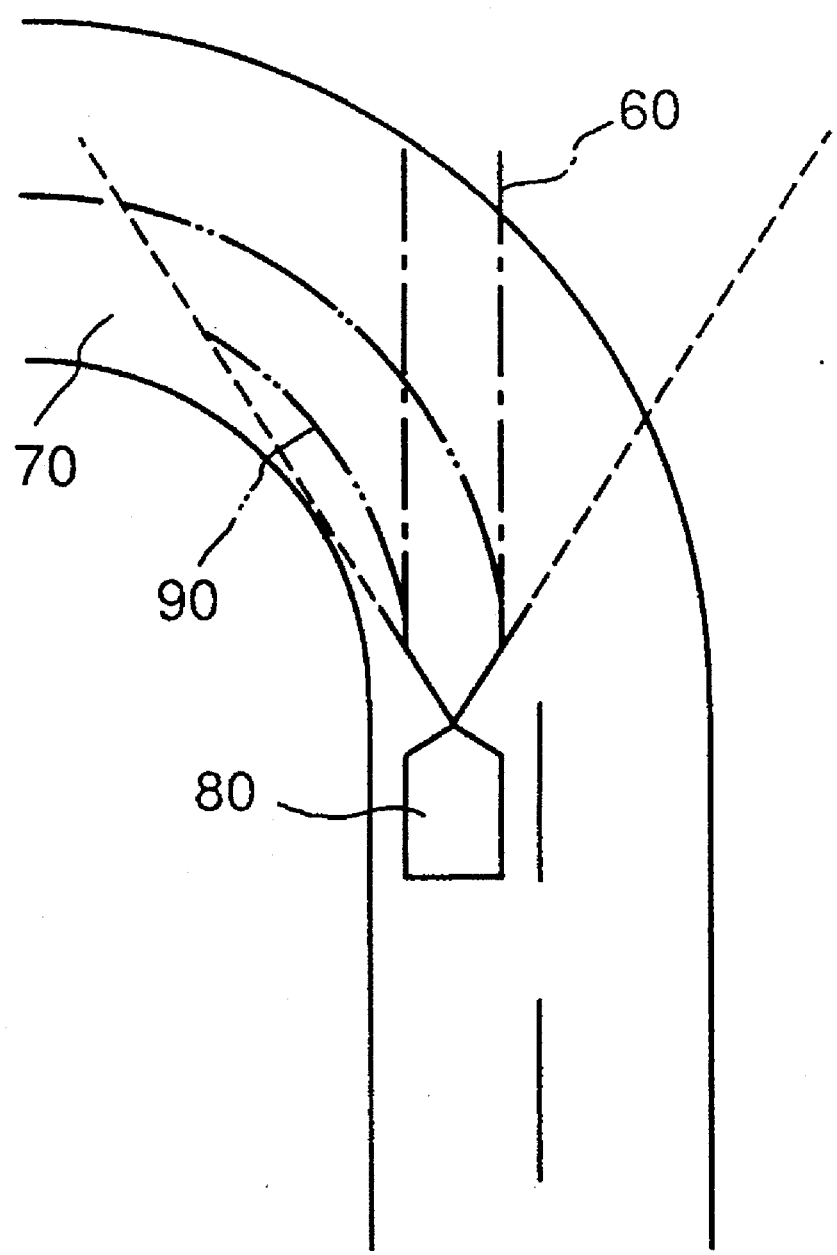
FIG. 10 illustrates correction of a deduced traveling-passage.

The danger level judging section 42 sets the obstacle judgment area in accordance with the subroutine as shown in FIG. 9. First, whether or not a deduced traveling-passage 60 is within a current traveling-passage 70 is determined in step S31. If YES, only within the deduced traveling-passage 60 is designated as the obstacle judgment area in step S32. Thereafter, the process returns to step S4. On the other hand, if NO, i.e., the deduced traveling-passage 60 is not within the current traveling-passage 70, the deduced traveling-passage 60 is corrected in step S33. For example, as shown in FIG. 10, when a vehicle 80 enters from a straight road to a curved road, a current traveling-passage 70 curves in front of the vehicle 80, while a deduced traveling-passage 60 is a straight line, thus the deduced traveling-passage 60 does not coincide with the current traveling-passage 70. In this case, the deduced traveling-passage correcting section 41 corrects the deduced traveling-passage 60. Thereafter, the process returns. In this manner, when a deduced traveling-passage 60 and a current traveling-passage 70 do not coincide, the deduced traveling-passage correcting section 41 corrects a deduced traveling-passage 60 so that the deduced traveling passage 60 coincides with a current traveling-passage 70. The danger level judging section 42 judges only an obstacle within the corrected deduced traveling-passage 90 as the highest danger level obstacle.

As described above, the third embodiment sets the width of the deduced traveling-passage 60 or the corrected deduced traveling-passage 90 narrower than that of the width of the vehicle 80 and wider than that of the current traveling-passage 70. Compared with the second embodiment which sets the danger level of a current traveling-passage 70 higher than that of a deduced traveling-passage 60, the third embodiment can define the obstacle judgment area more appropriately, and realizes more efficient obstacle sensing.

Fourth Embodiment

Figure 11:
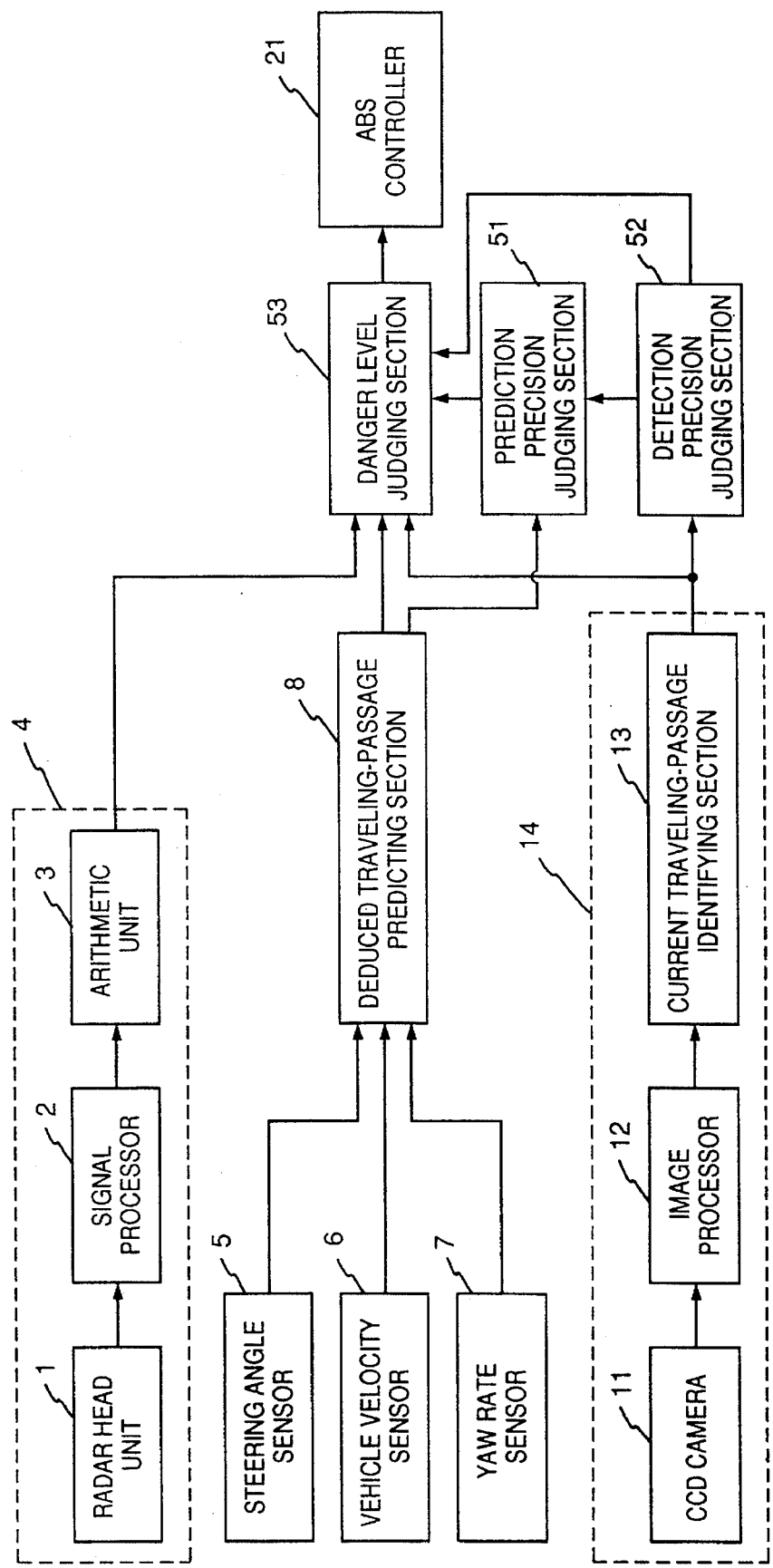
FIG. 11 is a block diagram showing the configuration of an obstacle sensing apparatus according to a fourth embodiment.

FIG. 11 shows the configuration of an obstacle sensing apparatus according to the fourth embodiment. This obstacle sensing apparatus has a prediction precision judging section 51 which judges the precision of the prediction of the deduced traveling-passage predicting section 8 and a detecting precision judging section 52 which judges the precision of detection of the current traveling-passage detecting section 14. The prediction precision judgment is calculating, e.g., erroneous operations of the sensors 5–7, erroneous operation of a CPU in the deduced traveling-passage predicting section 8, and bumpy state of a road surface. The detecting precision judgment is calculating, e.g., quality of photographing by the CCD camera 11 by detecting the photographing distance of the CCD camera 11 based on white lines on a road surface or the like. Judgment signals from the judging sections 51 and 52 enter a danger level judging section 53. It should be noted that the other elements in FIG. 11 are identical to those in FIG. 1, therefore, the corresponding elements have the same reference numerals and the explanations of these elements will be omitted.

Figure 12:
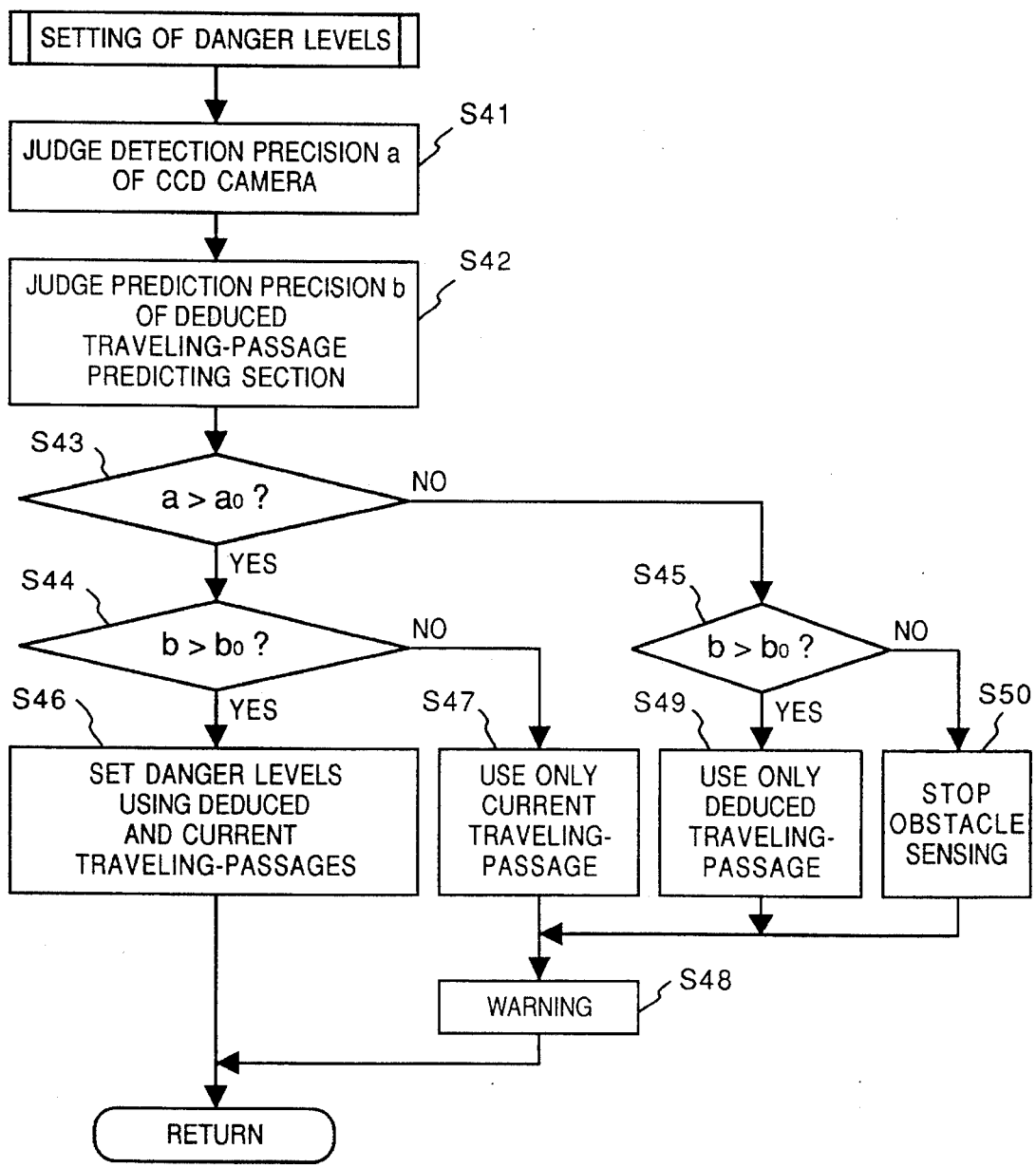
FIG. 12 is a flowchart showing a subroutine of setting a danger level order.

The danger level judging section 53 sets the danger levels in accordance with the subroutine in FIG. 12. First, the prediction precision judging section 5 judges a detecting precision a of the CCD camera 11 in step S41, and the detecting precision judging section 52 judges a prediction precision b in step S42. Thereafter, whether or not the detecting precision a is greater than a predetermined value $a_0$ is determined in step S43, and whether or not the prediction precision b is greater than a predetermined value $b_0$ is determined in step S44 or S45. If YES in steps S43 to S45, i.e., it is determined that the detecting precision a and the prediction precision b are both greater than the predetermined value, the danger level order is set using a deduced traveling-passage 60 and a current traveling-passage 70 in step S46. Similarly to the first embodiment, the danger level of an area A1 where the deduced traveling-passage 60 and the current traveling-passage 70 overlap with each other is set to the highest level; the danger level of an area A2 within the current traveling-passage 70 and without the deduced traveling-passage 60, to an intermediate level; and the danger level of an area A3 within the deduced traveling-passage 60 and without the current traveling-passage 70, to a lower level. Thereafter, the process returns to step S6.

On the other hand, if YES in step S43 and NO in step S44, i.e., the detecting precision a is excellent but the prediction precision b is not excellent, the danger level of only the current traveling-passage 70 is set to the highest danger level, and the deduced traveling-passage 60 is excluded from the obstacle judgment area in step S47. In step S48, the movement of the vehicle is regarded as dangerous, the ABS controller 21 sounds an alarm as warning operation. Then the process returns. If NO in step S43 and YES in step S45, i.e., the prediction precision b is excellent but the detecting precision a is not excellent, only the danger level of the deduced traveling-passage 60 is set to the highest danger level in,step S49, and the current traveling-passage 70 is excluded from the obstacle judgment area. In step S48, the ABS controller 21 performs the warning operation. Then the process returns. Further, if NO in steps S43 and S45, i.e., both the detecting precision a and the prediction precision b are lower than the predetermined value, the obstacle sensing is stopped in step S50. In step S48, the movement of the vehicle is regarded as dangerous, and the ABS controller 21 performs warning operation. Then the process returns to Step S5.

As described above, if any one of detecting precision a of the current traveling-passage detecting section 14 or a prediction precision b of the deduced traveling-passage predicting section 8 is lower than a predetermined value, the danger level judging section 53 sets the danger level of the only obstacle within the current traveling-passage or within the deduced traveling-passage to the highest danger level.

As described above, if a detecting precision a of the current traveling-passage detecting section 14 (CCD camera 11) or a prediction precision b of the deduced traveling-passage predicting section 8 is lower than a predetermined value, the fourth embodiment sets the danger level of the only obstacle, sensed by the current traveling-passage detecting section having a predetermined detecting precision, within a current traveling-passage, or only the obstacle, predicted by the deduced traveling-passage predicting section having a predetermined prediction precision, within a deduced traveling-passage, to the highest danger level. This makes obstacle sensing efficient and improves the reliability of the sensing.

As it is apparent from the above description, according to the embodiments, the danger level of a sensed obstacle is judged in accordance with a deduced traveling-passage predicted based on the running state of a vehicle and a current traveling-passage detected by the current traveling-passage detecting section. Accordingly, the present invention attains efficient obstacle sensing for judging possibility of encounter between the vehicle with the obstacle. In addition, the present invention prevents erroneous sensing such as judging a guardrail on a road as an obstacle when entering from a straight road to a curved road.

The present invention is not limited to the above embodiments and various changes and modifications can be made within the spirit and scope of the present invention. Therefore, to apprise the public of the scope of the present invention, the following claims are made.

What is claimed is:

1. A vehicle obstacle sensing apparatus comprising:
   (a) deduced traveling-passage prediction means for predicting a deduced traveling-passage on which a vehicle will travel, based on a steering angle, a yaw rate and a velocity of the vehicle;
   (b) current traveling-passage detection means for detecting a current traveling-passage on which the vehicle is currently moving;
   (c) obstacle sensing means for sensing at least one obstacle within a predetermined area; and
   (d) danger level judgment means for judging a danger level of an obstacle sensed by said obstacle sensing means, in accordance with an area within which said obstacle is sensed, and one of the deduced traveling-passage predicted by said deduced traveling-passage prediction means and the current traveling-passage detected by said current traveling-passage detection means.

2. The apparatus according to claim 1, further comprising steering angle detection means for detecting the steering angle of the vehicle.

3. The apparatus according to claim 1, further comprising yaw rate detection means for detecting the yaw rate of the vehicle.

4. The apparatus according to claim 1, further comprising velocity detection means for detecting the velocity of the vehicle.

5. The apparatus according to claim 1, wherein said deduced traveling-passage prediction means calculates a turning radius of a first deduced traveling-passage and a first lateral slip angle of the vehicle, based on the steering angle and the velocity of the vehicle.

6. The apparatus according to claim 5 wherein said deduced traveling-passage prediction means calculates a turning radius of a second deduced traveling-passage and a second lateral slip angle of the vehicle, based on the yaw rate and the velocity of the vehicle.

7. The apparatus according to claim 6, wherein said deduced traveling-passage prediction means predicts the first deduced traveling-passage, based on the steering angle and the velocity of the vehicle, predicts the second deduced traveling-passage, based on the yaw rate and the velocity of the vehicle, and selects one of the first and the second deduced traveling-passages.

8. The apparatus according to claim 7, wherein, if the steering angle is smaller than a predetermined value, said deduced traveling-passage prediction means selects the second deduced traveling-passage, and if the steering angle is greater than the predetermined value, said deduced traveling-passage prediction means selects one of the first and second deduced traveling-passages according to which of the first and the second deduced traveling-passages has a smaller turning radius.

9. The apparatus according to claim 1, wherein said current traveling-passage detection means is a CCD camera which identifies the current traveling-passage as an image.

10. The apparatus according to claim 1, wherein said obstacle sensing means is a scanning-type radar unit which calculates a distance between a sensed obstacle and the vehicle, a relative velocity between the sensed obstacle and the vehicle and a direction of the sensed obstacle with respect to the vehicle, as respective obstacle data.

11. The apparatus according to claim 1, further comprising automatic braking system control means for controlling a braking force upon each wheel.

12. The apparatus according to claim 10, further comprising an automatic braking system control means for controlling a braking force upon each wheel, wherein said automatic braking system control means judges a possibility of collision between a sensed obstacle and the vehicle based on the obstacle data, and controls the automatic braking system and an alarm, as danger avoiding operation.

13. The apparatus according to claim 1, wherein said danger level judgment means sets the danger level of an obstacle within an area in which the deduced traveling-passage and the current traveling-passage overlap with each other to a highest danger level, and sets the danger level of other obstacles, respectively, in an area within the current traveling-passage and without the deduced traveling-passage, in an area within the deduced traveling-passage and without the current traveling-passage, and in an area except the current and deduced traveling-passage, to lower danger levels in a descending order.

14. The apparatus according to claim 13, further comprising an automatic braking system control means for controlling a braking force upon each wheel, wherein said danger level judgment means outputs data related to the obstacle of highest danger level to said automatic braking system control means.

15. A vehicle obstacle sensing apparatus comprising:
(a) current traveling-passage detection means for detecting a current traveling-passage on which the vehicle is currently running;
(b) obstacle sensing means for sensing a plurality of obstacles within a predetermined area;
(c) road curvature change detection means for detecting, in advance, a curvature change of the current traveling-passage; and
(d) danger level judgment means for judging a danger level of an obstacle sensed by said obstacle sensing means, in accordance with the curvature change detected by said road curvature change detection means and an area where said obstacle is sensed within the current traveling-passage detected by said current traveling-passage detection means.

16. The apparatus according to claim 15, further comprising steering angle detection means for detecting a steering angle of the vehicle, yaw rate detection means for detecting a yaw rate of the vehicle, velocity detection means for detecting a velocity of the vehicle, and deduced traveling-passage prediction means for predicting a deduced traveling-passage on which the vehicle will travel, based on the detected steering angle, the yaw rate and the velocity.

17. The apparatus according to claim 16, wherein said deduced traveling-passage prediction means calculates a turning radius of a first deduced traveling-passage and a first lateral slip angle of the vehicle, based on the steering angle and the velocity of the vehicle.

18. The apparatus according to claim 17, wherein said deduced traveling-passage prediction means calculates a turning radius of a second deduced traveling-passage and a second lateral slip angle of the vehicle, based on the yaw rate and the velocity of the vehicle.

19. The apparatus according to claim 18, wherein said deduced traveling-passage prediction means predicts the first deduced traveling-passage, based on the steering angle and the velocity of the vehicle, predicts the second deduced traveling-passage, based on the yaw rate and the velocity of the vehicle, and selects one of the first and second deduced traveling-passages.

20. The apparatus according to claim 19, wherein, if the steering angle is smaller than a predetermined value, said deduced traveling-passage prediction means selects the second deduced traveling-passage, and if the steering angle is greater than the predetermined value, said deduced traveling-passage prediction means selects one of the first and second deduced traveling-passages according to which of the first and second deduced traveling-passages has a smaller turning radius.

21. The apparatus according to claim 15, wherein said current traveling-passage detection means is a CCD camera which identifies the current traveling-passage as an image.

22. The apparatus according to claim 15, wherein said obstacle sensing means is a scanning-type radar unit which calculates a distance between a sensed obstacle and the vehicle, a relative velocity between the sensed obstacle and the vehicle and a direction of the sensed obstacle with respect to the vehicle, as respective obstacle data.

23. The apparatus according to claim 15, further comprising automatic braking system control means for controlling a braking force upon each wheel.

24. The apparatus according to claim 22, further comprising automatic braking system control means for controlling a braking force upon each wheel, wherein said automatic braking system control means judges a possibility of collision between the sensed obstacle and the vehicle based on the obstacle data, and controls the automatic braking system and an alarm, as danger avoiding operation.

25. The apparatus according to claim 15, wherein said road curvature change detection means detects an object laid under the current traveling-passage, at a point a predetermined distance ahead of a portion where the curvature change starts.

26. The apparatus according to claim 15, wherein said danger level judgment means judges the danger level of a sensed obstacle, based on time elapsed from detecting the obstacle.

27. The apparatus according to claim 26, further comprising automatic braking system control means for controlling a braking force upon each wheel, wherein said danger level judgment means outputs data of an obstacle of highest danger level out of the danger levels of the obstacles to said automatic braking system control means.

28. A vehicle obstacle sensing apparatus comprising:
(a) deduced traveling-passage prediction means for predicting a deduced traveling-passage on which a vehicle will travel, based on a steering angle, a yaw rate and a velocity of the vehicle;
(b) current traveling-passage detection means for detecting a current traveling-passage on which the vehicle is currently running;
(c) obstacle sensing means for sensing at least one obstacle within a predetermined area;

(d) deduced traveling-passage correction means for defining an obstacle judgment area for judging a danger level of an obstacle based on the deduced traveling-passage predicted by said deduced traveling-passage prediction means and the current traveling-passage detected by said current traveling-passage detection means; and (e) danger level judgment means for judging the danger level of an obstacle sensed by said obstacle sensing means, in accordance with an area where said obstacle is sensed within the obstacle judgment area defined by said deduced traveling-passage correction means.

29. The apparatus according to claim 28, further comprising steering angle detection means for detecting the steering angle of the vehicle.

30. The apparatus according to claim 28, further comprising yaw rate detection means for detecting the yaw rate of the vehicle.

31. The apparatus according to claim 28, further comprising velocity detection means for detecting the velocity of the vehicle.

32. The apparatus according to claim 28, wherein said deduced traveling-passage prediction means calculates a turning radius of a first deduced traveling-passage and a first lateral slip angle of the vehicle, based on the steering angle and the velocity of the vehicle.

33. The apparatus according to claim 32, wherein said deduced traveling-passage prediction means calculates a turning radius of a second deduced traveling-passage and a second lateral slip angle of the vehicle, based on the yaw rate and the velocity of the vehicle.

34. The apparatus according to claim 33, wherein said deduced traveling-passage prediction means predicts the first deduced traveling-passage, based on the steering angle and the velocity of the vehicle, predicts the second deduced traveling-passage, based on the yaw rate and the velocity of the vehicle, and selects one of the first and second deduced traveling-passages.

35. The apparatus according to claim 34, wherein, if the steering angle is smaller than a predetermined value, said deduced traveling-passage prediction means selects the second deduced traveling-passage, and if the steering angle is greater than the predetermined value, said deduced traveling-passage prediction means selects one of the first and second deduced traveling-passages according to which of the first and second deduced traveling-passages has a smaller turning radius.

36. The apparatus according to claim 28, wherein said current traveling-passage detection means is a CCD camera which identifies the current traveling-passage as an image.

37. The apparatus according to claim 28, wherein said obstacle sensing means is a scanning-type radar unit which calculates a distance between a sensed obstacle and the vehicle, a relative velocity between the sensed obstacle and the vehicle and a direction of the sensed obstacle with respect to the vehicle, as respective obstacle data.

38. The apparatus according to claim 28, further comprising automatic braking system control means for controlling a braking force upon each wheel.

39. The apparatus according to claim 37, further comprising an automatic braking system control means for controlling a braking force upon each wheel, wherein said automatic braking system control means judges a possibility of collision between a sensed obstacle and the vehicle based on the obstacle data, and controls the automatic braking system and an alarm, as danger avoiding operation.

40. The apparatus according to claim 28, wherein, if the deduced traveling-passage is outside of the current traveling-passage, said deduced traveling-passage correction means corrects the deduced traveling-passage so that the deduced traveling-passage coincides with the current traveling-passage, and sets the corrected deduced traveling-passage within the obstacle judgment area.

41. The apparatus according to claim 28, further comprising an automatic breaking system control means for controlling a braking force upon each wheel, wherein said danger level judgment means outputs data related to an obstacle of highest danger level to said automatic braking system control means.

42. A vehicle obstacle sensing apparatus comprising:

(a) deduced traveling-passage prediction means for predicting a deduced traveling-passage on which a vehicle will travel, based on a steering angle, a yaw rate and a velocity of the vehicle;

(b) current traveling-passage detection means for detecting a current traveling-passage on which the vehicle is currently running;

(c) obstacle sensing means for sensing at least one obstacle within a predetermined area;

(e) danger level judgment means for judging a danger level of an obstacle sensed by said obstacle sensing means, based on the prediction precision and the detection precision judged by said precision judgment means.

43. The apparatus according to claim 42, further comprising steering angle detection means for detecting the steering angle of the vehicle.

44. The apparatus according to claim 42, further comprising yaw rate detection means for detecting the yaw rate of the vehicle.

45. The apparatus according to claim 42, further comprising velocity detection means for detecting the velocity of the vehicle.

46. The apparatus according to claim 42, wherein said deduced traveling-passage prediction means calculates a turning radius of a first deduced traveling-passage and a first lateral slip angle of the vehicle, based on the steering angle and the velocity of the vehicle.

47. The apparatus according to claim 46, wherein said deduced traveling-passage prediction means calculates a turning radius of a second deduced traveling-passage and a second lateral slip angle of the vehicle, based on the yaw rate and the velocity of the vehicle.

48. The apparatus according to claim 47, wherein said deduced traveling-passage prediction means predicts a first deduced traveling-passage, based on the steering angle and the velocity of the vehicle, predicts a second deduced traveling-passage, based on the yaw rate and the velocity of the vehicle, and selects one of the first and the second deduced traveling-passages.

49. The apparatus according to claim 48, wherein if the steering angle is smaller than a predetermined value, said deduced traveling-passage prediction means selects the second deduced traveling-passage, and if the steering angle is greater than the predetermined value, said deduced traveling-passage prediction means selects one of the first and second deduced traveling-passages according to which of the first and second deduced traveling-passages has a smaller turning radius.

50. The apparatus according to claim 42, wherein said current traveling-passage detection means is a CCD camera which identifies the current traveling-passage as an image.

51. The apparatus according to claim 42, wherein said obstacle sensing means is a scanning-type radar unit which calculates a distance between an obstacle and the vehicle, a relative velocity between the obstacle and the vehicle and a direction of the obstacle with respect to the vehicle, as respective obstacle data.

52. The apparatus according to claim 42, further comprising automatic braking system control means for controlling a braking force upon each wheel.

53. The apparatus according to claim 51, further comprising an automatic braking system control means for controlling a braking force upon each wheel, wherein said automatic braking system control means judges a possibility of collision between an obstacle and the vehicle based on the obstacle data, and controls the automatic braking system and an alarm, as danger avoiding operation.

54. The apparatus according to claim 42, wherein, if any of the prediction precision and the detection precision is lower than a predetermined value, said precision judgment means set a danger level of an obstacle within any of the current traveling-passage and the deduced traveling-passage to a high danger level.

55. The apparatus according to claim 42, further comprising an automatic braking system control means for controlling a braking force upon each wheel, wherein said danger level judgment means outputs data related to an obstacle of highest danger level to said automatic braking system control means.

56. The apparatus according to claim 1, wherein said danger level judgment means judges said danger level of an obstacle sensed by said obstacle sensing means, in accordance with an area within which said obstacle is sensed, and one of the deduced traveling-passage predicted by said deduced traveling-passage prediction means, the current traveling-passage detected by said current traveling-passage detection means, and a common area of both the deduced traveling-passage and current traveling passage.

* * * * *